United States Patent
Burkman

(10) Patent No.: US 10,262,810 B1
(45) Date of Patent: Apr. 16, 2019

(54) MOVEABLE CONTACT SUPPORT STRUCTURE AND SUPPORTING METHOD

(71) Applicant: Ford Global Technologies, LLC, Dearborn, MI (US)

(72) Inventor: Wesley Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/806,387

(22) Filed: Nov. 8, 2017

(51) Int. Cl.
| | |
|---|---|
| *H01H 1/50* | (2006.01) |
| *H01H 3/02* | (2006.01) |
| *H01H 1/06* | (2006.01) |
| *H01H 9/52* | (2006.01) |
| *B60L 11/18* | (2006.01) |
| *B60L 11/12* | (2006.01) |

(52) U.S. Cl.
CPC ............... *H01H 1/50* (2013.01); *H01H 3/02* (2013.01); *B60L 11/123* (2013.01); *B60L 11/1851* (2013.01); *B60Y 2200/92* (2013.01); *B60Y 2410/115* (2013.01); *H01H 9/52* (2013.01); *H01H 2203/024* (2013.01); *Y10S 903/904* (2013.01)

(58) Field of Classification Search
CPC .............................................. H01H 1/50–3/02
See application file for complete search history.

(56) References Cited

U.S. PATENT DOCUMENTS

| | | | |
|---|---|---|---|
| 8,138,872 B2* | 3/2012 | Yoshihara | ............ H01F 7/1615 335/124 |
| 9,269,507 B2* | 2/2016 | Enomoto | ............ H01H 50/546 |
| 9,721,741 B2 | 8/2017 | Shiinoki et al. | |
| 9,978,537 B2* | 5/2018 | Kroeker | ................... H01H 1/20 |
| 2011/0076901 A1 | 3/2011 | Glick et al. | |

FOREIGN PATENT DOCUMENTS

CN          102324342          1/2012

* cited by examiner

*Primary Examiner* — Vanessa Girardi
(74) *Attorney, Agent, or Firm* — Carlson, Gaskey & Olds, P.C.

(57) ABSTRACT

An exemplary contactor assembly includes, among other things, a moveable contact that moves back and forth between an electrically coupled position with a plurality of stationary contacts, and an electrically decoupled position with the stationary contacts. A support structure is configured to limit flexing of the moveable contact when in the electrically coupled position. An exemplary support method includes, among other things, transitioning a moveable contact from an electrically decoupled position to an electrically coupled position with a plurality of stationary contacts. The method further includes limiting a flexing movement of the moveable contact with a support structure.

8 Claims, 5 Drawing Sheets

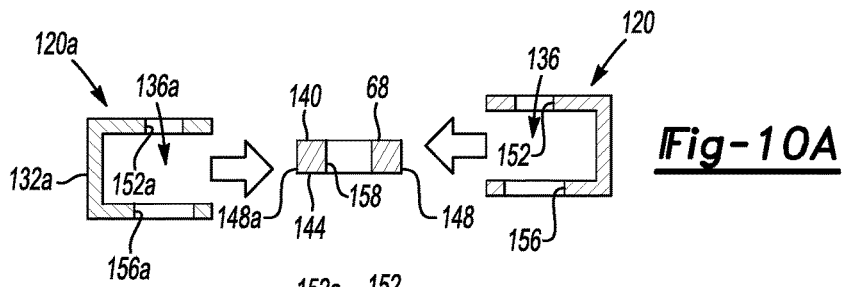
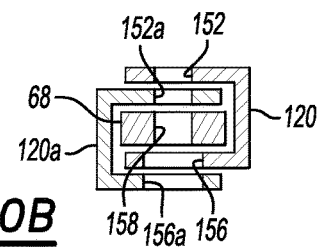
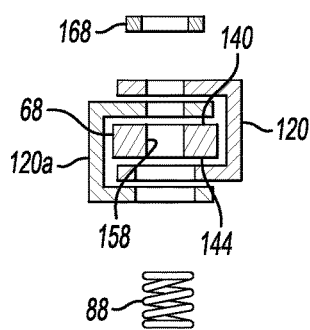
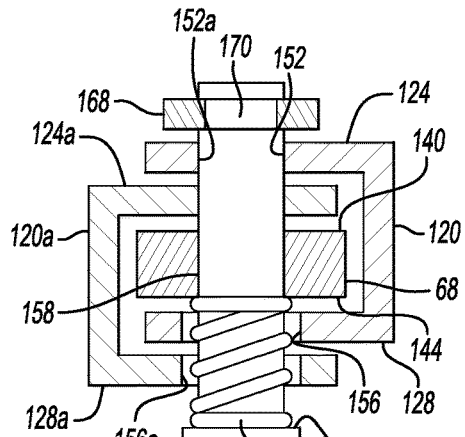
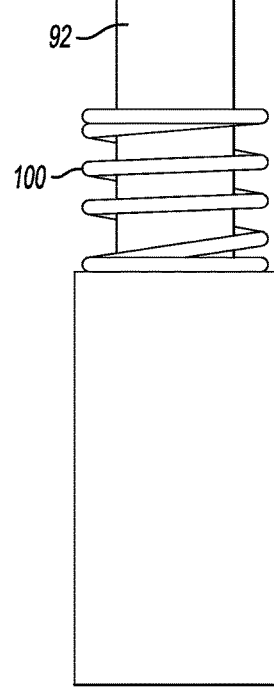

MOVEABLE CONTACT SUPPORT STRUCTURE AND SUPPORTING METHOD

TECHNICAL FIELD

This disclosure relates generally to a contactor assembly and, more particularly, to a support structure that limits flexing of a movable contact within the contactor assembly.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle.

A contactor assembly can be used to control a flow of electric power to and from the high-voltage battery pack. A high current rating is often desirable for components that, like the contactor assembly, are used in connection with the high-voltage battery pack. For a given component, the current rating can be related to an expected thermal energy level for the component during operation. Generally, the current rating can correspond to a maximum current that the component can carry without the component heating so much that the component deforms or is otherwise compromised. Deformation of components of the contactor assembly, such a moveable contact within the contractor assembly can undesirably disrupt the flow of electric power through the contactor assembly.

SUMMARY

A contactor assembly according to an exemplary aspect of the present disclosure includes, among other things, a moveable contact that moves back and forth between an electrically coupled position with a plurality of stationary contacts, and an electrically decoupled position with the stationary contacts. A support structure is configured to limit flexing of the moveable contact when in the electrically coupled position.

In a further non-limiting embodiment of the foregoing assembly, the support structure is configured to move with the moveable contact back and forth between the electrically coupled and electrically decoupled positions.

In a further non-limiting embodiment of any of the foregoing assemblies, when in the electrically coupled position, a first side of the moveable contact electrically contacts one the stationary contacts at a first lateral position, and another of the stationary contacts at a second lateral position spaced from the first position. The support structure extends along an opposing, second side of the movable contact from the first lateral position to the second lateral position.

A further non-limiting embodiment of any of the foregoing assemblies includes an actuator assembly engaging the moveable contact between the first and second lateral positions. The actuator assembly is configured to move the moveable contact axially back and forth between the electrically coupled and electrically decoupled positions.

In a further non-limiting embodiment of any of the foregoing assemblies, the moveable contact includes a first side that electrically contacts the stationary contacts when the moveable contact is in the electrically coupled position, and an opposite second side. The support structure has a first portion disposed adjacent to the first side and a second portion disposed adjacent to the second side.

In a further non-limiting embodiment of any of the foregoing assemblies, the first portion is laterally between a first and second one of the stationary contacts. The second portion extends laterally in a first direction to a point of contact between the first stationary contact and the moveable contact, and laterally in a second direction to a point of contact between the second stationary contact and the moveable contact.

In a further non-limiting embodiment of any of the foregoing assemblies, the support structure includes a support bracket providing a channel that receives the moveable contact such that portions of the support bracket are disposed along opposing sides of the moveable contact, and further disposed along another side of the moveable contact that is transverse to the opposing sides.

In a further non-limiting embodiment of any of the foregoing assemblies, the support bracket is a first support bracket providing a first channel. The support structure further includes a second support bracket providing second channel. Portions of the second support bracket are disposed along opposing sides of the moveable contact, and further disposed along another side of the moveable contact that is transverse to the opposing sides.

In a further non-limiting embodiment of any of the foregoing assemblies, the moveable contact has a first material composition, and the support structure has a second, different material composition that is more resistant to thermal relaxation than the first material composition.

A support method according to an exemplary aspect of the present disclosure includes, among other things, transitioning a moveable contact from an electrically decoupled position to an electrically coupled position with a plurality of stationary contacts. The method further includes limiting a flexing movement of the moveable contact with a support structure.

In a further non-limiting embodiment of the foregoing method, a first side of the moveable contact electrically contacts the stationary contacts at respective contact positions when the moveable contact is in the electrically coupled position. The support structure is disposed along an opposite, second side of the moveable contact in areas laterally aligned with the respective contact positions.

A further non-limiting embodiment of any of the foregoing methods includes moving an actuator assembly along an axis to transition the moveable contact. The actuator assembly engages the moveable contact between the lateral positions.

In a further non-limiting embodiment of any of the foregoing methods, the support structure is additionally disposed along the first side in an area laterally aligned with the actuator assembly.

In a further non-limiting embodiment of any of the foregoing methods, the moveable contact is held within a channel provided by the support structure, and respective portions of the support structure are disposed along opposing sides of the moveable contact, and another side of the moveable contact that is transverse to the opposing sides.

In a further non-limiting embodiment of any of the foregoing methods, the support structure includes a first support bracket providing a first channel. The support structure further includes a second support bracket providing second channel such that portions of the second support bracket are disposed along opposing sides of the moveable contact, and further disposed along another side of the moveable contact that is transverse to the opposing sides.

In a further non-limiting embodiment of any of the foregoing methods, the respective portions of the support structure are portions of the same continuous, monolithic support bracket.

In a further non-limiting embodiment of any of the foregoing methods, the moveable contact is spring-biased toward the electrically coupled position from a position that is between a pair of the plurality of stationary contacts.

In a further non-limiting embodiment of any of the foregoing methods, the moveable contact has a first material composition, and the support structure has a second, different material composition that is more resistant to thermal relaxation than the first material composition.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows:

FIG. 10A illustrates a section view representing a step in a process of assembling a support structure and a movable contact to an actuator of the contactor assembly of FIGS. 2 and 3.

FIG. 10B illustrates a section view representing a step in the process of assembling a support structure and a movable contact to an actuator of the contactor assembly after the step illustrated in FIG. 10A.

FIG. 10C illustrates a section view representing a step in the process of assembling a support structure and a movable contact to an actuator of the contactor assembly after the step illustrated in FIG. 10B.

FIG. 10D illustrates a section view of the support structure and the movable contact assembled to the actuator of the contactor assembly after the step illustrated in FIG. 10C.

DETAILED DESCRIPTION

This disclosure details exemplary embodiments of a contactor assembly.

The contactor assembly, in particular, includes a support structure associated with a movable contact. The support structure limits flexing of the movable contact as it heats up during operation. Limiting the flexing of the movable contact can allow a higher current rating of the contactor assembly. Cooling of the moveable contact with a fluid, for example, can be difficult due to, among other things, the location of the moveable contact within the contactor assembly.

Figure 1:
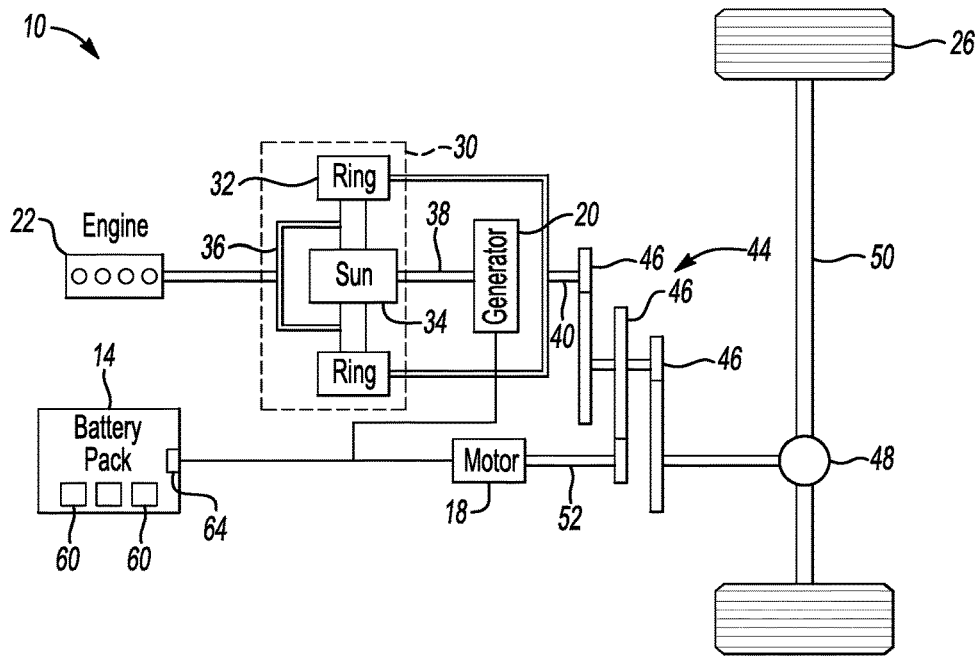
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

The battery pack 14 provides a relatively high-voltage battery that can store generated electrical power and can output electrical power to operate the motor 18, the generator 20, or both.

The exemplary battery pack 14 provides a relatively high-voltage battery that can store generated electrical power and can output electrical power to operate the motor 18, the generator 20, or both. Arrays 60 of individual battery cells can be held within the battery pack 14 to store electrical power.

Figure 2:
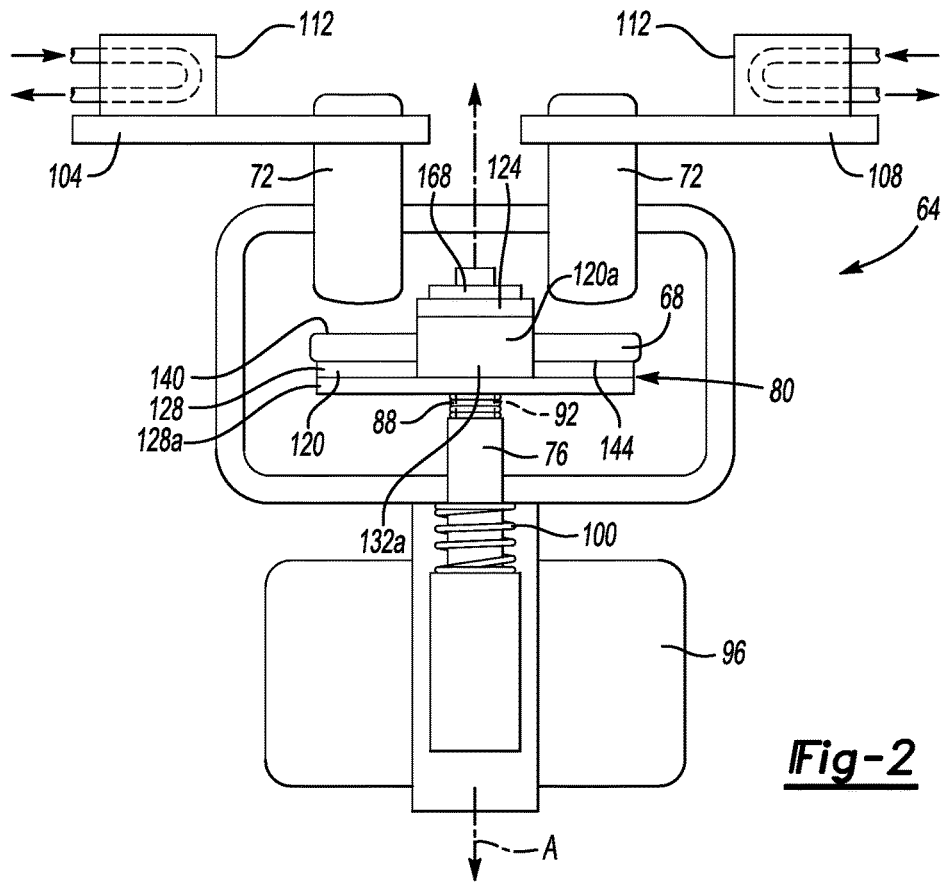
FIG. 2 illustrates a contactor assembly of the powertrain of FIG. 1 when in an open, electrically decoupled position.
Figure 3:
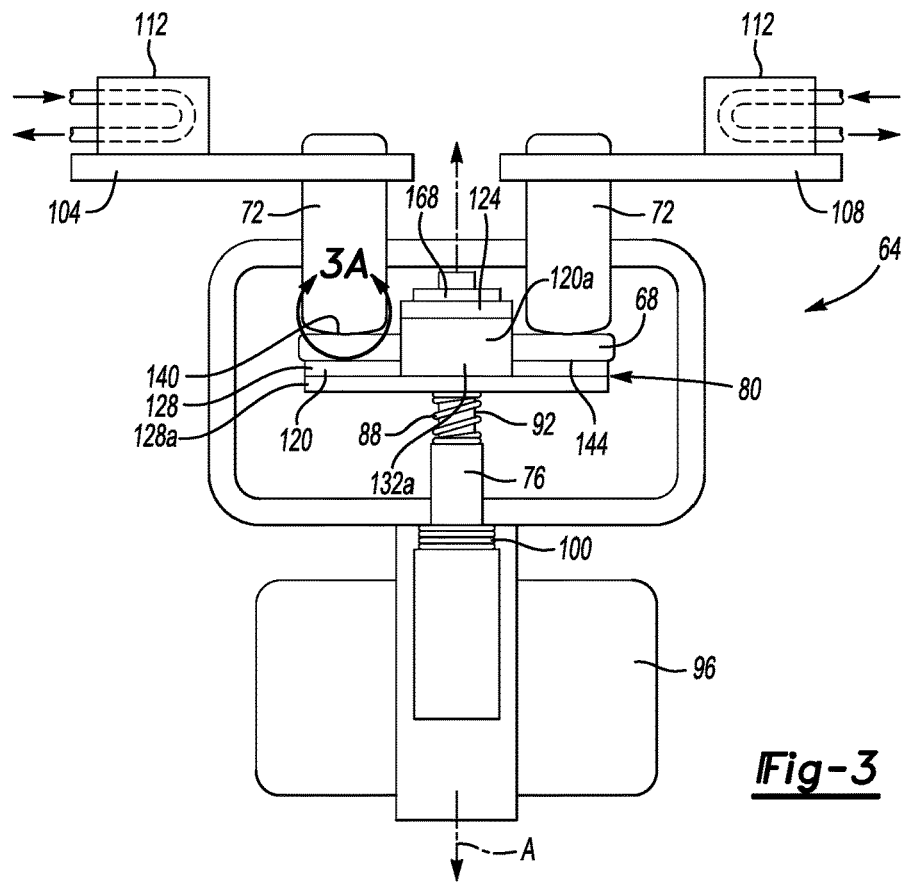
FIG. 3 illustrates the contactor assembly of FIG. 2 when in a closed, electrically coupled position.

Referring now to FIGS. 2 and 3 with continuing reference to FIG. 1, a contactor assembly 64 can be disposed within the battery pack 14. Although one contactor assembly 64 is shown, more than one of the contactor assembly 64 could be used, as required.

The contactor assembly 64 can transition to an open position (FIG. 2) where the contactor assembly 64 electrically decouples the battery pack 14 from other portions of the powertrain 10. The contactor assembly 64 can transition to a closed position (FIG. 3) where the battery pack 14 is electrically coupled, through the contactor assembly 64, to other portions of the powertrain 10.

In some examples, the contactor assembly 64 is transitioned to the open position when a vehicle having the powertrain 10 is faulted or the vehicle is turned off. The contactor assembly 64 can be, for example, be transitioned to the open position when a worker is performing maintenance of the powertrain 10 or another area of the vehicle. Transitioning the contactor assembly 64 to the open position can reduce a likelihood of exposing the worker to the relatively high-voltages of the battery pack 14.

Although, in this example, the contactor assembly 64 is shown within the battery pack 14, other positions are possible. For example, the contactor assembly 64 could be positioned outside the battery pack 14. When outside the battery pack 14, the contactor assembly 64 in the open position still electrically decouples the battery pack 14 from other portions of the powertrain 10, and the contactor assembly 64 in the closed position still electrically couples the battery pack 14 to the other portions of the powertrain 10.

The example contactor assembly 64 is a relatively high-voltage, high-power contactor assembly, such as 1 Form X type contactor assembly. Other examples could use other types of contactor assemblies.

The contactor assembly 64 includes a movable contact 68, a plurality of stationary contacts 72, an actuator assembly 76, and a support structure 80. The actuator assembly 76 is configured to move the movable contact 68 back and forth between the open position of FIG. 2 and the closed position of FIG. 3.

In the open position, the movable contact 68 is spaced from the stationary contacts 72. In the closed position, the movable contact 68 is electrically coupled to the stationary contacts 72.

Figure 3A:
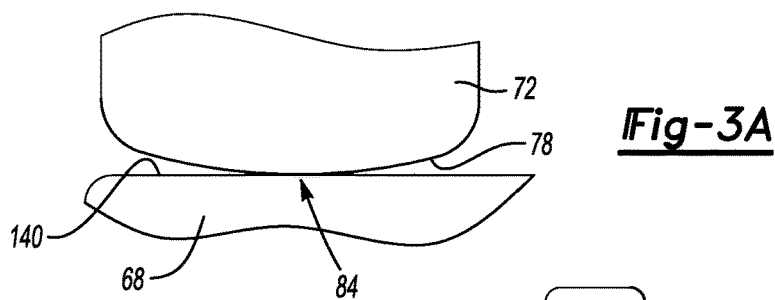
FIG. 3A illustrates a close-up view of area FIG. 3A in FIG. 3.

In this example, a face 78 (FIG. 3A) of the stationary contacts 72 is rounded. Due to the face 78 being rounded, the movable contact 68, when closed, contacts a relatively small area of the face at a point of contact 84.

The moveable contact 68 is secured to the actuator assembly 76. The actuator assembly 76 and the movable contact 68 are biased toward the closed position utilizing a contact spring 88 distributed annularly about a portion of a shaft 92 of the actuator assembly 76. The contact spring 88 is a coil spring in this example.

The actuator assembly 76 is biased toward the open position utilizing a return spring 100 distributed annularly about a portion of a shaft 92 of the actuator assembly 76. The return spring 100 is a coil spring in this example.

The shaft 92 moves back and forth with the moveable contact 68 along an axis A. For purposes of this disclosure, axial and lateral relationships are with reference to the axis A.

In this example, a coil winding 96 can be energized to linearly move the shaft 92 along the axis A to overcome the biasing force applied by the return spring 100 and move the movable contact 68 toward the stationary contacts 72, which transitions the contactor assembly 64 from the open position to the closed position. The coil winding 96 can be a solenoid that, when charged, acts as an electromagnet to pull the shaft 92, and thus the moveable contact 68, along the axis A toward from the stationary contact 72.

When the contactor assembly 64 is in the closed position, current can pass from a busbar 104, through one of the stationary contacts 72, through the movable contact 68, through the other one of the stationary contacts 72, and to another busbar 108.

Thermal energy can be generated as current passes through the contactor assembly 64. The contactor assembly 64 could also be exposed to thermal energy from other sources.

Heat sinks 112 disposed adjacent the busbars 104 and 108. In this example, the heat sinks 112 are liquid-cooled heat sinks. A liquid, such as water, passes through the heat sinks 112 to carry thermal energy from the heat sinks 112. The thermal energy can be drawn from the busbars 104 and 108, and other areas of the contactor assembly 64. The heat sinks 112 could be other heat sinks other than liquid-cooled heat sinks in other examples. For example, the heat sinks 112 could be air-cooled.

As can be appreciated, the path that thermal energy travels from the movable contact 68 to the heat sinks 112 is less direct than the path that thermal energy travels from the stationary contacts 72 to the heat sinks 112. Further, with reference to FIG. 3A, thermal energy from the moveable contact 68 moves through the points of contact 84 to the heat sinks 112. The points of contact 84 have a relatively small area, which can restrict thermal energy transfer from the moveable contact 68 to the heat sinks 112. The heat sinks 112 thus provide less cooling to the moveable contact 68 than the stationary contacts 72 and busbars 104, 108.

Figure 4:
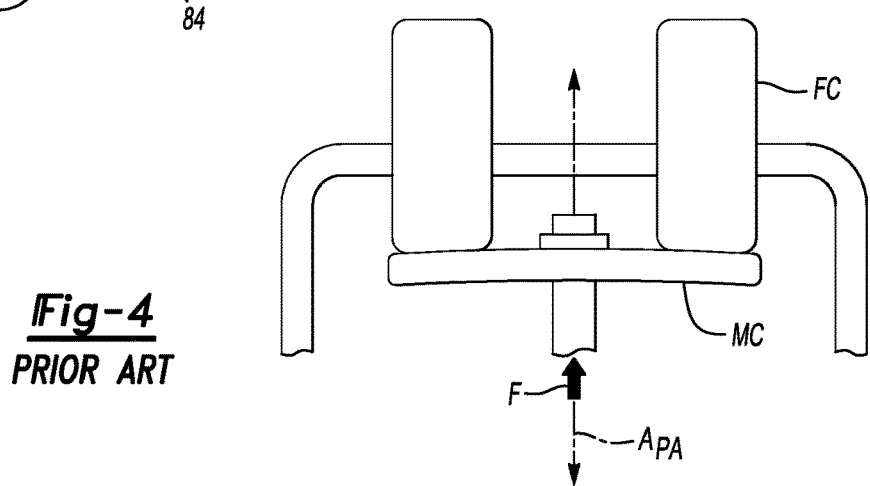
FIG. 4 illustrates a portion of a prior art conductor assembly when deformed.
Figure 5:
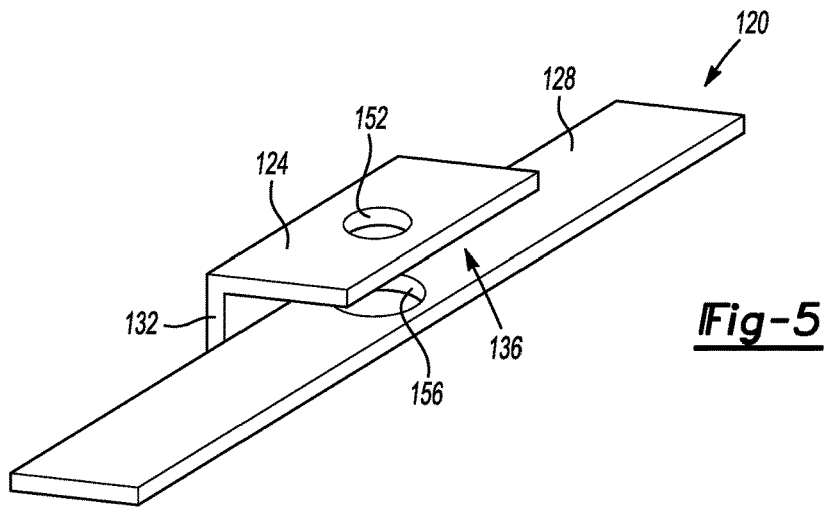
FIG. 5 illustrates a perspective view of a support bracket utilized within a support structure of the contactor assembly of FIGS. 2 and 3.
Figure 6:
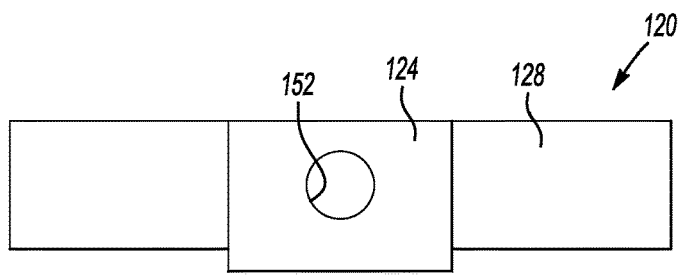
FIG. 6 illustrates a top view of the support bracket of FIG. 5.
Figure 7:
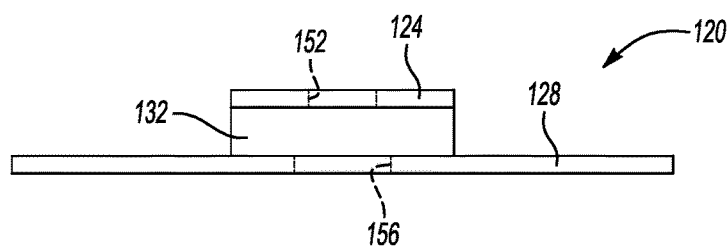
FIG. 7 illustrates a side view of the support bracket of FIG. 5.
Figure 8:
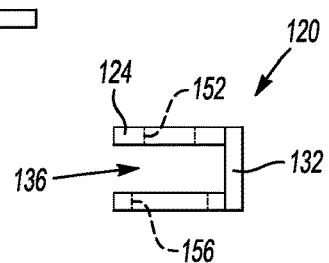
FIG. 8 illustrates an end view of the support bracket of FIG. 5.
Figure 9:
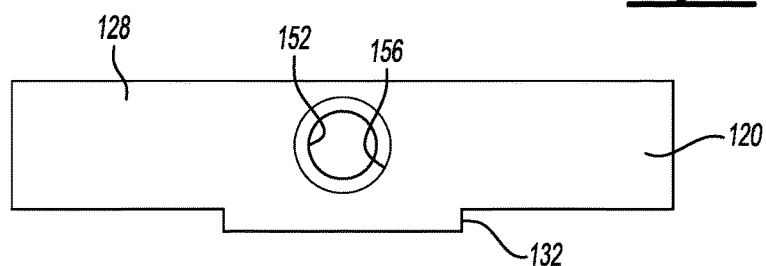
FIG. 9 illustrates a bottom view of the support bracket of FIG. 5.

As shown in the prior art contactor assembly of FIG. 4, excessive thermal energy could cause a prior art movable contact MC to flex when in the closed position. The flexing is caused by, among other things, a force F that urges a median area of the prior art movable contact MC toward the prior art stationary contacts FC while movements at the laterally outboard portions of the movable contact MC are prevented by the stationary contacts FC. The prior art moveable contact MC moves back and forth between the open and closed positions along an axis $A_{P4}$. The flexing of the prior art moveable contact MC displaces the laterally outer portions of the prior art moveable contact MC axially relative to a median of the prior art moveable contact MC. The flexing essentially bows the prior art moveable contact MC. Flexing, as can be appreciated is undesirable. In the prior art, to avoid flexing, a current rating for the prior art contactor assembly was established.

Referring again to FIGS. 2 and 3 and with additional reference to FIGS. 5 to 10D, the contactor assembly 64, according to an exemplary embodiment of the present disclosure, uses a support structure 80 as a backing component to resist flexing movements of the movable contact 68. Incorporating the support structure 80 thereby facilitates a higher current rating for the movable contact 68.

The support structure 80 includes at least a first support bracket 120. The support bracket comprises a first portion 124 and a second portion 128. The first portion 124 and the second portion 128 are disposed along opposing, axially facing sides of the movable contact 68. The support bracket 120 includes a third portion 132 that extends axially from the first portion 124 to the second portion 128. The first portion 124, the second portion 128, and the third portion 132 provide a channel 136 that receives the movable contact 68.

The first portion 124 is disposed along a first side 140 of the movable contact 68 when the movable contact 68 is received within the channel 136. The first side 140 interfaces directly with the stationary contacts 72 when the movable contact 68 is in the closed position.

The second portion 128 of the support bracket 120 is disposed along a second side 144 of the movable contact 68 when the movable contact 68 is received within the channel 136. The second side 144 is opposite the first side 140.

The third portion 132 is disposed along a third side 148 of the movable contact 68 when the movable contact 68 is received within the channel 136. The third side 148 is transverse to the first side 140 and the second side 144.

When assembled, the shaft 92 extends through an aperture 152 within the first portion 124, an aperture 156 within the second portion 128, as well as an aperture 158 within the moveable contact 68.

Relative to the axis A, the first portion 124 is positioned laterally between the stationary contacts 72. The lateral width of the first portion 124 is kept smaller than a distance between the stationary contacts 72 to ensure adequate clearance to the stationary contacts. The second portion 128, however, extends laterally to the stationary contacts 72.

The bracket 120 has a material composition that is more resistant to thermal relaxation than a material composition of the movable contact 68. In one example, the movable contact 68 is a copper or copper alloy, whereas the bracket 120 is a stainless steel.

For purposes of this disclosure, a resistance to thermal relaxation for a given material refers to the ability of the material composition to resist bending and deformation at a given temperature. A material having a relatively high elastic modulus is stiffer and more resistant to thermal relaxation. A material having a relatively low elastic modulus is more easily deformed elastically and is less resistant to thermal relaxation. Stainless steel, for example, is stiffer than copper at a given temperature. Stainless steel is this more resistant to thermal relaxation than a copper or copper-alloy.

Because the bracket 120 is more resistant to thermal relaxation, the bracket 120 resists flexing of the movable contact 68 at temperatures that would, without the bracket 120, otherwise cause the moveable contact 68 to flex.

In this exemplary embodiment, the first portion 124 resists movement of a region of the movable contact 68 near the shaft 92 relative to the laterally outer regions of the moveable contact 68 when the movable contact 68 is biased toward the stationary contacts 72 in the closed position. The second portion 128 extends laterally to at least a point of contact 84 (FIG. 3A) between each of the stationary contacts 72 and the movable contact 68. The second portion 128 opposes the forces exerted on the moveable contact 68 by the stationary contact 72 when the moveable contact 68 is biased toward the stationary contacts 72 in the closed position. The first portion 124 and the second portion 128 thus together limit flexing movement of the movable contact 68.

In an exemplary embodiment of the present disclosure, the support structure 80 includes the bracket 120 as a first bracket and, additionally, a second bracket 120a. The example, bracket 120a is dimensioned similarly to the bracket 120, which can reduce manufacturing complexity. Although shown as incorporating both the bracket 120 and the second bracket 120a, the support structure 80, in other examples, could include only one of the brackets, or more than two brackets.

When assembled, a portion 132a of the second bracket 120 is disposed along a fourth side 148a of the movable contact 68 that is opposite the side 148. The movable contact 68 is nested within the channel 136 of the bracket 120, and additionally within a channel 136a of the bracket 120a.

When assembled as shown in FIG. 10D, the contact spring 88 can extend through the aperture 156 in the second portion 128 of the bracket 120, and additionally through an aperture 156a in a second portion 128a of the second bracket 120a. A diameter of the contact spring 88 is thus less than a diameter of the aperture 156 and less than a diameter of the aperture 156a. One end of the contact spring 88 rests against a ledge 160, and an opposing end of the contact spring 88 directly contacts the movable contact 68.

A portion of the shaft 92 having a reduced diameter extends from the ledge 160 through the apertures 156 and 156a, and additionally through the apertures 152 and 152a. The portion of the shaft 92 also extends through the aperture 158 in the moveable contact 68.

A retainer clip 168 can be secured within a groove at an end portion of the shaft 92 to inhibit movement of the brackets 120, 120a, and the movable contact 68 away from the shaft 92.

Figure 11:
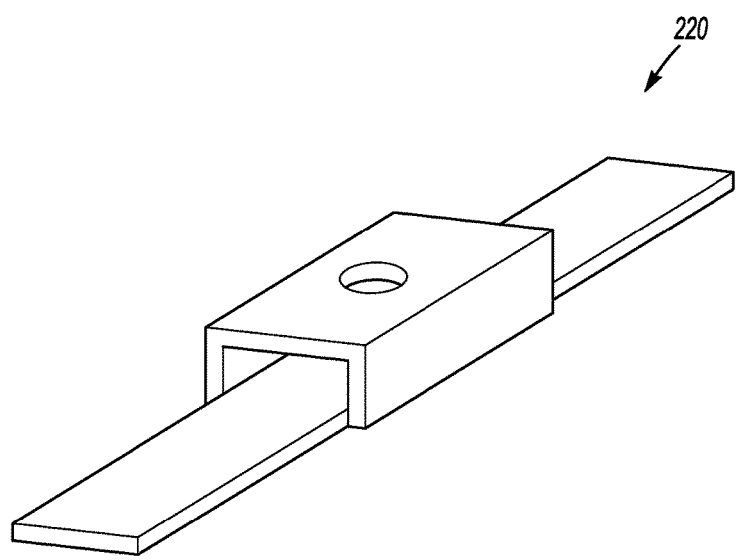
FIG. 11 illustrates a bracket of a support structure according to another exemplary embodiment of the present disclosure.

Referring to FIG. 11, a bracket 220 according to another exemplary embodiment can be used in place of the brackets 120, 120a of FIGS. 2-10D. The bracket 220 is a support structure that, in this example, can be made of a single machined piece of material, a machined rectangular extrusion, or multiple individual pieces that are joined together via, for example, a welding process.

Features of the disclosed examples include a bracket that can be used in connection with a movable contact of a contactor assembly to resist relaxation of the movable contact, particularly at elevated temperatures.

In some examples, a movable contact that is copper and is not supported by a support structure, will relax and flex at temperatures from 125-150° C. The addition of the support structure having a material more resistive to thermal relaxation, such as stainless steel, has been found to substantially prevent flexing of the moveable contact at temperatures up to 180° C. or higher.

The addition of the supportive structure enables a current rating for the movable contact to be significantly increased, in some examples by two or more times, provided the rest of the contactor system capability can also be significantly increased. The moveable contact is not flexed, and is thus able to effectively match the increased capability of the rest of the contactor that may be enabled by cooling methods.

In some examples, cross-sectional thickness of the movable contact can additionally be increased to reduce thermal energy generated due to passage of electrical current when the contactor assembly is closed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A contactor assembly, comprising:
 a moveable contact that moves back and forth between an electrically coupled position with a plurality of stationary contacts, and an electrically decoupled position with the stationary contacts;
 an actuator assembly that engages the moveable contact and extends through an aperture in the moveable contact; and
 a support structure configured to limit flexing of the moveable contact when in the electrically coupled position,
 wherein the moveable contact includes a first side that electrically contacts the stationary contacts when the moveable contact is in the electrically coupled position, and an opposite second side, the support structure having a first portion disposed adjacent to the first side and a second portion disposed adjacent to the second side, the actuator assembly extending through both an aperture in the first portion of the support structure and an aperture in the second portion of the support structure.

2. The contactor assembly of claim 1, wherein the first portion is laterally between a first and second one of the stationary contacts, and the second portion extends laterally in a first direction to a point of contact between the first stationary contact and the moveable contact, and laterally in a second direction to a point of contact between the second stationary contact and the moveable contact.

3. The contactor assembly of claim 1, wherein the moveable contact has a first material composition, and the support structure has a second, different material composition that is more resistant to thermal relaxation than the first material composition.

4. The contactor assembly of claim 1, wherein, when in the electrically coupled position, a first side of the moveable contact electrically contacts one of the stationary contacts at a first lateral position, and another of the stationary contacts at a second lateral position spaced from the first position,
 wherein the support structure extends along an opposing, second side of the movable contact from the first lateral position to the second lateral position and directly supports the moveable contact from the first lateral position to the second lateral position when in the electrically coupled position.

5. The contactor assembly of claim 4, wherein the actuator assembly engages the moveable contact between the first and second lateral positions, the actuator assembly configured to move the moveable contact axially back and forth between the electrically coupled and electrically decoupled positions.

6. The contactor assembly of claim 1, wherein the support structure includes a support bracket providing a channel that receives the moveable contact such that portions of the support bracket are disposed along opposing sides of the moveable contact, and further disposed along a first transverse side of the moveable contact that is transverse to the opposing sides, wherein a first one of the opposing sides of the moveable contact electrically contacts the stationary contacts when the moveable contact is in the electrically coupled position with the stationary contacts, wherein the portion of the support bracket disposed along the first one of the opposing sides is positioned between the stationary contacts when the moveable contact is in the electrically coupled position with the stationary contacts.

7. The contactor assembly of claim 6, wherein the support bracket is a first support bracket providing a first channel, and the support structure further comprises a second support bracket providing second channel such that portions of the second support bracket are disposed along opposing sides of the moveable contact, and further disposed along a second transverse side of the moveable contact that is transverse to the opposing sides and opposite the first transverse side.

8. The contactor assembly of claim 6, wherein the first support bracket is separate and distinct from the second support bracket such that no portion of the first support bracket provides any portion of the second support bracket.

* * * * *